United States Patent [19]

Proux et al.

[11] 4,107,137

[45] Aug. 15, 1978

[54] PHENOLIC ANTIOXIDANTS FOR SYNTHETIC POLYMERS

[75] Inventors: Yves Proux; Christian Julien, both of Paris, France

[73] Assignee: Societe Francaise d'Organo Synthese, Gennevilliers, France

[21] Appl. No.: 754,019

[22] Filed: Dec. 23, 1976

Related U.S. Application Data

[63] Continuation-in-part of Ser. No. 557,680, Mar. 12, 1975, abandoned.

[30] Foreign Application Priority Data

Mar. 12, 1974 [FR] France .............................. 74 08403

[51] Int. Cl.$^2$ ......................... C08K 5/41; C08K 5/13; C07C 69/78; C07C 141/00
[52] U.S. Cl. ...................... 260/45.85 T; 260/45.95 C; 260/456 NS; 560/75; 560/140
[58] Field of Search ................. 260/475 PN, 45.8 ST, 260/45.85 T, 45.95 C, 456 NS; 560/75, 140

[56] References Cited

U.S. PATENT DOCUMENTS

| | | | |
|---|---|---|---|
| 3,255,136 | 6/1966 | Hecker | 260/23 |
| 3,579,561 | 5/1971 | Meltsner | 260/45.85 |
| 3,862,211 | 1/1974 | Havinger | 260/45.85 |

*Primary Examiner*—V. P. Hoke
*Attorney, Agent, or Firm*—Eyre, Mann, Lucas & Just

[57] ABSTRACT

This invention relates to compounds of formula Q—O—R—O—Q wherein Q represents a substituted or unsubstituted 2-(2-hydroxybenzyl) phenyl group, and R is a residue of a di- or tri-basic, organic or inorganic acid. Compounds in accordance with the invention can be used as stabilizers for plastics materials, in particular to provide them with thermal stability and stability against ultra violet light. The low volatilities of these compounds compared with the analogous di-phenols Q—O—H render them of particular value.

10 Claims, No Drawings

PHENOLIC ANTIOXIDANTS FOR SYNTHETIC POLYMERS

This application is a continuation-in-part of application Ser. No. 557,680 filed Mar. 12, 1975 now abandoned.

This invention relates to phenolic diesters which can be used as stabilizers for plastics materials.

Numerous phenolic derivatives have been proposed hitherto as anti-oxidants and as thermal stabilizers of plastics materials such as polyolefins. In particular, it has been proposed hitherto to use a diphenol of formula

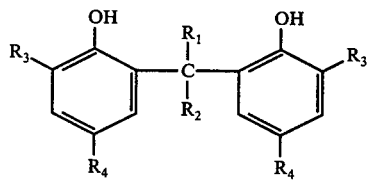

wherein $R_1$ and $R_2$ are preferably hydrogen atoms, $R_4$ is preferably a lower alkyl group, such as a methyl group, and $R_3$ is preferably a t-butyl group.

For numerous plastics materials, such as polyolefins, these phenolic derivatives are too volatile. They have a tendency to become eliminated from plastics materials, through evaporation, and they can then no-longer act as stabilizers.

According to the present invention there are provided compounds of formula $$Q - O - R - O - Q \qquad \text{II}$$

in which Q represents a group of formula

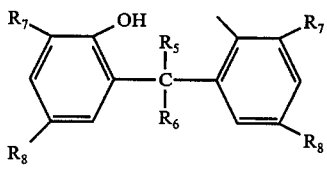

(wherein $R_5$, $R_6$, $R_7$ and $R_8$, which may be the same or different, each represents a hydrogen atom or an alkyl group) and R represents a group derived from a di- or tri-basic, organic or inorganic acid or represents a group of formula $$- R (O R)_n -$$

(wherein R is a hereinbefore defined and n is an integer).

Compounds of formula II have been found to provide a particularly good stabilizing action on plastics materials while exhibiting low volatility.

Suitable groups R derived from inorganic di- or tri-basic acids can be derived from sulfurous acid or boric acid. When R is derived from a di-basic organic acid, it may be represented by the formula

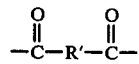

wherein R' is an aliphatic or aromatic group. R' is preferably an aromatic group, and in particular a paraphenylene radical.

Compounds of formula II can be prepared by known methods, for example by reacting an acid chloride of a polyfunctional acid with a bisphenol of formula I. The reaction can be performed using an excess of the bisphenol, under conditions whereby hydrogen chloride is eliminated as it is formed by combination with a base.

The preferred compound of formula II, by virtue of its stabilizing properties with plastics materials is the diester obtained by reacting 2,2'-methylene bis-(4-methyl-6-t-butylphenol) with the dichloride of terephthalic acid. The product obtained is of formula

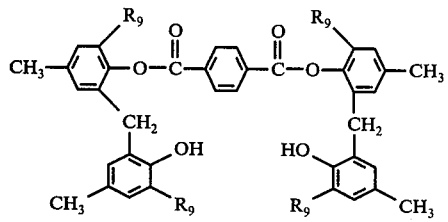

in which $R_9$ represents a t-butyl group.

The compound can be prepared by heating a slight excess of the diphenol with the di-acid chloride of terephthalic acid in the presence of an amine which forms the corresponding hydrochloride with hydrogen chloride. The reaction can be effected in the presence or absence of a solvent, and also in a medium which is a solvent for the desired product.

Polyesters of formula II have low volatility (being less volatile than the diphenol used as the starting material) and have substantial anti-oxidant properties. In addition, compounds of formula II in which R represents an aryl group can be converted into benzophenone-type compounds which absorb ultraviolet radiation. This makes them of interest in protecting plastics materials against thermal and photochemical degradation.

The following Examples are given by way of illustration only, and they show the preparation of the preferred compound, i.e., the terephthalate of 2,2'-methylene bis-(4-methyl-6-t-butylphenol) hereinafter referred to as HPM 12.

EXAMPLE 1

Preparation of HPM 12 in a Solvent 700 g (2.06 moles) of 2,2'-methylene bis-(4-methyl 6-t-butylphenol), dissolved at ambient temperature in 5000 g of alcohol-free anhydrous chloroform, were introduced into a 6-liter reactor having an agitator, a condenser, a dropping funnel, a thermometer, and a tube permitting nitrogen bubbling, as required. A slight current of nitrogen was then introduced into the solution, and agitation started. At the end of one hour, 202 g (1 mole) of the di-chloride of terephthalic acid were quickly added. The solution was heated to 60° C, and 210 g (2.08 moles) of triethylamine were introduced over 1 hour. A slight distillation of the chloroform occurred. After all the triethylamine had been added, refluxing was maintained by heating for 5 hours, and thereafter the solution was cooled to 20° C. The solution was washed four times with 3000 g of water in order to eliminate triethylamine hydrochloride. The organic phase was concentrated (2000 g of $CHCl_3$ were evaporated), cooled to 5° C, and 2500 g of ethanol were added drop by drop to precipitate the product. The product was washed with 1000 g of ethanol, and dried to leave a white powder having the following properties:

melting point — 244°-247° C
hydroxyl index (found) — 147: (theory 140)
saponification index (found) — 137: (theory 140)
acid index (found) — 1.6: (theory 0)
elemental analysis, found: C,79.60%; H,7.90%; calculated: C,79.96%; H,8.20%.

The weight of product obtained was 712 g, corresponding to a yield of 88%.

EXAMPLE 2

Preparation of HPM 12 without a Solvent 595 g (5 moles) of thionyl chloride were added at 20° C to 166 g (1 mole) of terephthalic acid in a 4-liter reactor equipped as in Example 1. Agitation was started, and the temperature raised to 70° C. 5 cm³ of pyridine were added very slowly, and the mixture was brought to SOCl$_2$ reflux for 8 hours. An abundant release of SO$_2$ and HCl occurred. The temperature was then reduced to 70° C, and the excess SOCl$_2$ and the remaining hydrogen chloride were removed under vacuum until setting of the mixture. Agitation was then stopped. The addition of small amounts of anhydrous benzene before setting facilitated elimination of the SOCl$_2$.

2000 g of anhydrous octane were then introduced into the reactor, and nitrogen bubbling and agitation were started. When all the acid chloride had dissolved, 680 g (2 moles) of 2,2'-methylene bis-(4-methyl-6-t-butylphenol) were quickly added. The temperature was raised to 80° C, and 210 g (2.08 moles) of triethylamine were added over 90 minutes. A white precipitate formed during the course of this introduction of triethylamine.

When the introduction was over, the temperature had increased to 90° C, and the reaction was continued for 4 hours. The mixture was then cooled to 20° C and the precipitate filtered. The solid product was dissolved in chloroform and purified as in Example 1. 624 g (yield 77%) were obtained of a white product melting at 245°-247° C.

In the preparation described hereinbefore, the synthesis of the dichloride of terephthalic acid can be carried out using dimethylformamide (DMF) instead of pyridine as catalyst, as follows:

166 g (1 mole) of terephthalic acid were introduced into a 2-liter reactor having an anchor stirrer, a vertical condenser, a dropping funnel, and an immersion thermometer. 595 g (5 moles) of cold thionyl chloride were added. The mixture was agitated and heated to effect SOCl$_2$ reflux.

When the temperature reached 45° C, 7.3 g of DMF (0.05 mole per mole of acid function) were introduced, accelerating the temperature rise. Hydrogen chloride and sulphur oxide which were released, as well as the SOCl$_2$ carried along therewith, were neutralized at the output of the condenser by bubbling into a solution of a base.

After three hours of SOCl$_2$ reflux, all the terephthalic acid had dissolved, which indicated the end of the reaction. Excess SOCl$_2$ was distilled at atmospheric pressure, and 63% of the excess thionyl chloride was recovered.

The chloride of the terephthalic acid obtained had a titre of 98.8% and it was produced in a yield of 100%.

By modifying the conditions in Examples 1 and 2, it is possible to produce:

a certain amount, generally low, of the monester of terephthalic acid. This occurs as a result of the presence of a small amount of water, the terephthalyl chloride being partly hydrolyzed to convert at least one acid chloride function into the carboxylic acid function. The presence of this monoester in the final product is no hindrance;

a polymeric product. If HO—Q'—OH represents the bisphenol, and HOOC—T—COOH represents terephthalic acid, the polymeric products that can be obtained are of formula:

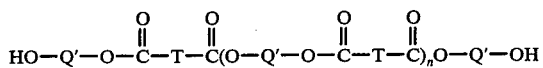

wherein $n$ is an integer less than or equal to 4. Such polymers also exhibit interesting anti-oxidant and anti-ultraviolet properties, but they are generally less soluble in polyolefins and have anti-oxidizing activities less than those of the diesters of formula II.

EXAMPLE 3

Synthesis of the Condensation Product of the Dichloride of Adipic Acid with the Diphenol I($R_1=R_2=H$; $R_4=CH_3$; $R_5-Bu^t$)

(a) Preparation of the Dichloride 730 g of adipic acid (5 moles) were reacted for 8 hours at a temperature of 60° C with 1820 g of thionyl chloride (15 moles) to give, after distillation of the excess SOCl$_2$, 910 g of the dichloride with a titre of 99.8%.

(b) Synthesis of the Ester, in a Solvent 640 g (2 moles) of 2,2'-methylene bis-(4-methyl 6-t-butylphenol) were dissolved in 1000 g of 1,2-dichloroethane. 183 g (1 mole) of liquid, adipyl chloride were added.

The introduction of 200 g (1.08 mole) of triethylamine at 70° C produced a precipitate. After washing with water and alcohol, 540 g of product were obtained:

appearance — light-yellow coloured powder
melting point — 201°-204° C
Hydroxyl index — 138
saponification index — 155
acid index — 0

EXAMPLE 4

Synthesis of the Condensation Product of the Dichloride of Azelaic Acid with the Diphenol I ($R_1=R_2=H$; $R_3=CH_3$; $R_4-Bu^t$)

(a) Preparation of the Dichloride

Using the same molar proportions and conditions as in Example 3, azelyl chloride was obtained with a titre of 99.8%.

(b) Synthesis of the Ester

A precipitate was formed, as in Example 3. Triethylamine hydrochloride was eliminated by filtration, and washing of the organic phase with water.

After distillation of the 1,2-dichloroethane, the product was crystallized from white spirit.

appearance — cream-coloured powder
Melting point —143°-145° C
hydroxyl index —160 saponification index —145
acid index —traces

EXAMPLE 5

Synthesis of the Condensation Product of Thionyl Chloride with the Diphenol I ($R_1=R_2=H$; $R_3=CH_3$; $R_4=Bu^t$)

340 g of 2,2'-methylene bis-(4-methyl-6-t-butyl-phenol) were placed in a 2-liter reactor having an anchor stirrer, a condenser, a dropping funnel, an immersion thermometer, and an input permitting nitrogen bubbling. The phenol was dissolved in 500 g of hot octane, a slight current of nitrogen being introduced into the solution. At the end of one hour of nitrogen bubbling, 80 g of thionyl chloride were added dropwise, the temperature being maintained at 78° C. The solution was heated to 80° C as long as hydrogen chloride was released. When the reaction was over, the medium was cooled, and the precipitate filtered, washed with octane and then dried. The product was a yield of 86% of a white powder with a melting point of 165° C.

The following tests show the anti-oxidant properties of HPM 12 compared with hitherto proposed anti-oxidants.

Stability 3.0 g of each substance under test were introduced and carefully spread over the entire surface of a Petri dish having a diameter of 10 cm. The dishes were heated in air to 200° C. Weighings were effected at regular intervals, and this enabled losses by evaporation or decomposition to be followed. The results obtained are summarised in Table I.

The results in Table I show that HPM 12 withstood heating under the given conditions better than the other anti-oxidants which were tested.

Anti-Oxidant Properties (1) On Polypropylene (a) Tests with Polypropylene Powder Mixtures were prepared of polypropylene powder (3 g) and various amounts of anti-oxidant, and the conventionally used synergistic agent, dilaurylthiodipropionate (DLTDP).

These mixtures were placed in Petri dishes and heated to different temperatures for various periods.

The results obtained were as follows:

With 0.03 mole of anti-oxidant/kg of polypropylene, and 0.01 mole DLDTP/kg of polypropylene, and heating for 36 hours to 150° C, the following were observed:

Polypropylene alone — dark brown agglomerate
Polypropylene + Topanol CA — brown powder
Polypropylene + Ionox 330 — yellow powder
Polypropylene + Irganox 1010 — light yellow powder
Polypropylene + HMP 12 — white powder With 0.3% by weight of anti-oxidant and 0.1% by weight of DLTDP based on the polypropylene, the following were observed:

(1) after heating for 168 hours at 120° C, and then for 24 hours at 180° C:

Polypropylene — brown film, total decomposition of polymer
Prolypropylene + BB10 — brown film, decomposition of the polymer
Prolypropylene + Topanol CA — light brown film, decomposition of polymer
Prolypropylene + Irganox 1010 — brown film, partial decomposition of polymer
Prolypropylene + Ionox 330 — yellow film, slight decomposition
Prolypropylene + HPM 12 — cream film, no decomposition.

(2) after heating at 170° C for 17 hours, the polypropylene film protected with HPM 12 did not decompose;

(3) after heating to 200° C for 100 minutes, the polypropylene film protected with HPM 12 remained flexible and translucent;

(4) after heating at 220° C for 20 minutes the polypropylene film protected with HPM 12 retained its color and flexibility.

All these tests show that HPM 12 is a very efficient anti-oxidant even at high temperatures (220° C, for example).

(b) Measurement by the "Brittle Test"

The test consisted firstly of making polypropylene test pieces containing a selected anti-oxidant, and thereafter ageing the test pieces in a ventilated oven at high temperature. The time (in hours) was determined which the polymer will withstand these ageing conditions while retaining its mechanical properties sufficient to enable it to be bent.

The test pieces had a thickness of 0.3 mm, and they were circular (diameter 80 mm).

The following results were obtained:
ageing temperature — 140° C.

|  | Composition I | Composition II |
|---|---|---|
| polypropylene | 100 | 100 |
| calcium stearate | 0.2 | 0.2 |
| D L T D P | 0 | 0.15 |
| HPM 12 | 0 | 0.05 |

The test pieces of Composition I did not withstand ageing for 10 hours, whereas the test pieces of Composition II withstood ageing for more than 1200 hours.
ageing temperature 150° C

|  | Composition III | Composition IV |
|---|---|---|
| polypropylene | 100 | 100 |
| calcium stearate | 0.1 | 0.1 |
| D S T D P (dilaurylthiodipropionate) | 0 | 0.25 |
| HPM 12 | 0 | 0.10 |

The test pieces to Composition III were completely destroyed after ageing for several hours (approximately 10) while the Composition IV test pieces withstood ageing for more than 1700 hours.

(2) On Polyethylene

Although polyethylene usually withstands thermal degradation better than polypropylene, anti-oxidants are required if its mechanical properties are to be long-lasting. The incorporation of a phenolic anti-oxidant sometimes causes the polymer to become colored, due to reaction of residual amounts of catalyst in the polyethylene with the phenolic anti-oxidant. Tests were conducted with HPM 12 and a high density polyethylene exhibiting coloration phenomena with phenolic anti-oxidants.

| | Composition V | Composition VI |
|---|---|---|
| Polyethylene (high density) | 100 | 100 |
| HPM 12 anti-oxidant | 0 | 0.015 |
| D L T D P | 0 | 0.030 |

The compositions were prepared in the cold in the form of a powder, placed in Petri dishes (3 g of substance per Petri dish of 90 mm diameter), and then placed in an oven.

(1) Heating for 20 mins to 200° C.
Composition (V) — yellow, highly reticulated product
Composition (VI) — white product with retention of its mechanical properties
(2) Heating for 20 mins. to 220° C
Composition V — coloured, partly decomposed product
Composition VI — white product with retention of its mechanical properties.

Tests made with hitherto proposed anti-oxidants gave colored and degraded films. In spite of the amount of HPM 12 used being small, it was particularly efficient as an antioxidant.

Ultra-violet Properties

The UV spectrum of HPM 12 shows a number of absorption bands, the molar absorption coefficients obtained being as follows:

| $m\mu$ | 215 | 245 | 280 | 300 |
|---|---|---|---|---|
| $\Sigma$ | 42500 | 31300 | 10600 | 3000 |

Polypropylene films containing 0.3% of HPM 12 and 0.1% of DLTDP were made by heating a suitable powder mixture. These films were irradiated for 50 hours with a PHILIPS HPR 125 ultra-violet lamp. The distance between the lamp and the films was 30 cm.

Polypropylene film without HPM 12 become hard and brittle. On the contrary, polypropylene film containing HPM 12 remained flexible and retained its mechanical properties, although it developed a slight yellow color.

TABLE I

| | Melting Point | Oven losses at 200° C (%) | | |
|---|---|---|---|---|
| | | After 2 hrs | After 4 hrs | and color |
| IRGANOX 1010 (GEIGY) | 118–120° C (white powder) | 0.64 | 0.85 | yellow |
| TOPANOL CA (ICI) | 178–180° C (cream powder) | 13.1 | 13.5 | brown |
| BB 10 (SFOS) | 204–207° C (white powder) | 10.2 | 23.6 | brown |
| IONOX 330 (SHELL) | 234–236° C (yellow powder) | 0.24 | 10.3 | brown |
| HPM 12 | 245–248° C (white powder) | 0.25 | 0.25 | white |

IRGANOX 1010

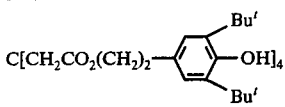

TOPANOL CA

TABLE I-continued

| | Melting Point | Oven losses at 200° C (%) | | |
|---|---|---|---|---|
| | | After 2 hrs | After 4 hrs | and color |

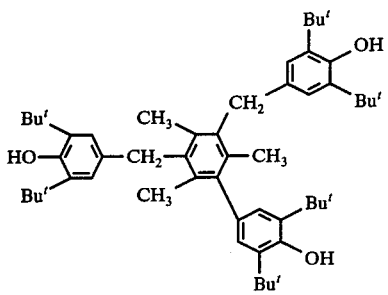

IONOX 330

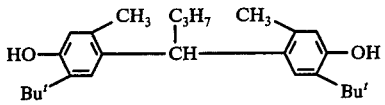

BB10

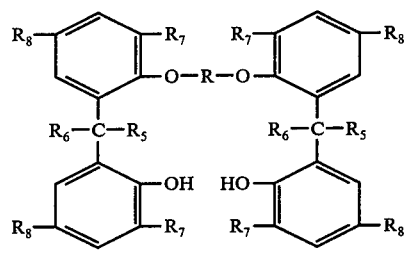

What is claimed is:

1. A compound of the formula:

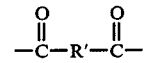

wherein:

$R_5$ and $R_6$ are hydrogen or alkyl groups $R_7$ and $R_8$ are alkyl groups

R is an acid group derived from the group consisting of thionyl chloride, phthalic acid and $$-\overset{O}{\underset{\|}{C}}-R'-\overset{O}{\underset{\|}{C}}-$$

wherein R' is an aliphatic group having from 1 to 7 carbon atoms.

2. The compound of claim 1 wherein each $R_5$ and $R_6$ are hydrogen.

3. The compound of claim 1 wherein each $R_7$ is a t-butyl group and each $R_8$ is a methyl group.

4. Bis[2-tert-butyl-4-methyl-6-(3-tert-butyl-5-methyl-2-hydroxy-benzyl)phenyl] terephthalate.

5. A synthetic polymer containing a stabilizing amount of from 0.01 to 0.5% by weight of a compound having the formula:

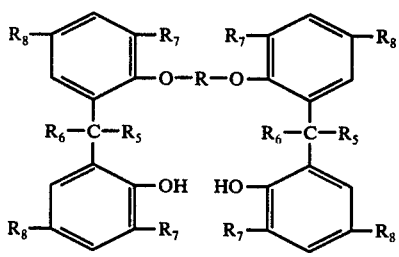

wherein:

$R_5$ and $R_6$ are hydrogen or alkyl groups $R_7$ and $R_8$ are alkyl groups

R is an acid group derived from the group consisting of thionyl chloride, phthalic acid and

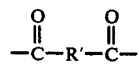

wherein R' is an aliphatic group having from 1 to 7 carbon atoms.

6. The polymer of claim 5 wherein the polymer is a polyolefin.

7. The composition of claim 5 wherein each $R_5$ and $R_6$ are hydrogen.

8. The composition of claim 5 wherein each $R_7$ is a t-butyl group and each $R_8$ is a methyl group.

9. A synthetic polymer containing a stabilizing amount of from 0.01% to 0.5% by weight of bis[2-tert-butyl-4-methyl-6-(3-tert-butyl-5-methyl-2-hydroxy-benzyl)phenyl] terephthalate.

10. The polymer of claim 9 wherein the polymer is a polyolefin.

* * * * *